US006283448B1

(12) United States Patent
Denton et al.

(10) Patent No.: US 6,283,448 B1
(45) Date of Patent: Sep. 4, 2001

(54) OFFSET BUTTERFLY VALVE

(76) Inventors: Daniel Webster Denton, *deceased*, late of Boling; Jewel Marie Denton, executor, P.O. Box 87, Boling, both of TX (US) 77420

( * ) Notice: Subject to any disclaimer, the term of this patent is extended or adjusted under 35 U.S.C. 154(b) by 0 days.

(21) Appl. No.: 09/552,082

(22) Filed: Apr. 19, 2000

(51) Int. Cl.$^7$ ....................................................... F16K 1/22
(52) U.S. Cl. ............................. 251/308; 251/74; 251/313
(58) Field of Search ............................... 251/66, 74, 305, 251/308, 313, 336

(56) References Cited

U.S. PATENT DOCUMENTS

| | | | |
|---|---|---|---|
| 3,809,361 | * 5/1974 | Pfundstien et al. | 251/305 |
| 3,941,151 | 3/1976 | Biddle . | |
| 4,533,114 | * 8/1985 | Cory et al. | 251/67 |
| 4,659,064 | * 4/1987 | Scobie et al. | 251/214 |
| 5,048,552 | * 9/1991 | Bourne | 137/39 |
| 5,103,858 | * 4/1992 | Hunt | 137/340 |
| 5,392,812 | 2/1995 | Herron . | |
| 5,464,696 | * 11/1995 | Gmelin | 123/337 |
| 5,673,895 | * 10/1997 | Kaneko | 251/306 |
| 5,676,110 | 10/1997 | Meneely . | |
| 5,762,044 | * 6/1998 | Hollister et al. | 123/400 |

* cited by examiner

*Primary Examiner*—Kevin Shaver
*Assistant Examiner*—D Austin Bonderer
(74) *Attorney, Agent, or Firm*—Michael B. Jolly

(57) ABSTRACT

An offset butterfly valve with a valve body, air flow conduit extending there through, and an offset rotatably mounted valve plate. The air flow conduit has with no interruptions to impede air flow there through. Cross sections along any location of the conduit are essentially round and of equal diameter while the valve plate is the shape of an oblique cross section of the conduit and rotatably mounted therein. The valve plate axis of rotation is offset with respect to the center of the valve plate and further offset with respect to a center of the conduit. Rotation of the valve plate within the conduit is accomplished by providing two opposing indentations on the interior of the conduit which accommodate the maximum diameter dimension of the valve plate when the valve plate is rotated to an open position. The indentations do not interrupt air flow through the conduit or the sealing of the valve plate periphery which may be easily machined to seal with a sealing surface of the interior of the conduit. A valve plate shaft may be contained within the valve body or may be accesses by removable side mount blocks. Various activation, biasing, or latching mechanisms may be included on the valve plate shaft and the valve may be utilized as a check or a positive shut-off valve.

7 Claims, 3 Drawing Sheets

OFFSET BUTTERFLY VALVE

TECHNICAL FIELD

The present invention relates to butterfly valves and more particularly to a butterfly valve with a valve body air flow conduit there through with no interruptions to impede or disrupt air flow. Any cross section of the conduit is about equal in diameter and essentially round. A valve plate is dimensioned as an oblique cross section of the conduit at a location in the conduit where the valve plate will seal. The valve plate has first and second coplanar sections extending on respective sides of its axis of rotation while the axis of rotation is offset with respect to the center of the valve plate and offset with respect to a center of the conduit. Rotation of the offset oblique shaped valve plate within the round conduit is accomplished by two opposing indentations on the interior surface of the conduit which accommodate a maximum diameter of an opened valve plate. The peripheral edge of the valve plate is easily machined to seal with an interior surface of the conduit which is continuous with the conduit interior surface providing a smooth unobstructed efficient air flow path.

BACKGROUND ART

Butterfly valves have been around a long time. One can find butterfly valves in numerous applications such as sewer vent stack checks, turbine checks, exhaust brakes, throttle valves, and air intake shut-off devices. Simplicity of operation make the butterfly valve the choice in these and many other applications. The offset butterfly valve was developed to satisfy the need for self closure which works nicely for check valves of all sort. One of the problems with the offset butterfly, is that rotating a round or oblique valve plate in a cylindrical conduit about a rotational axis offset from the center of the valve plate and offset from the center of the conduit is impossible because the maximum diameter of the valve plate will not be accommodated by the dimensional cross section within the conduit along the plane parallel with the rotation axis of the valve plate and parallel with the center of the conduit. An assortment of solutions to this problem have been described in the prior art, such as:

Biddle, U.S. Pat. No. 3,941,151 which describes and claims a vent pipe check valve with offset valve plate that provides an example of placing semi-annular seat means for sealing at upper and lower surfaces of the valve plate on respective opposite sides of the valve plate pivot axis.

Meneely, U.S. Pat. No. 5,676,110 which describes and claims an exhaust brake with offset butterfly valve plate that provides an example of enlarging an upstream section of the conduit to accommodate the maximum diameter of the valve plate rotating into the enlarged area.

Herron, U.S. Pat. No. 5,392,812 which describes an offset hinged flapper valve useful as a turbine inlet check valve providing an example of altering the valve plate dimensions with side planar surfaces, which decrease the maximum diameter of the valve plate, while also providing accompanying planar surfaces on the interior of the conduit to accommodate the valve plate.

While the prior art has satisfied numerous problems associated with offset butterfly valves there is always a need to improve air flow efficiency through the valve air flow conduit which, as those skilled in the art know, is accomplished by reducing air flow disruption caused by interruptions in the air flow path. The present invention accomplishes this by providing a butterfly valve with no interruptions extending into the air flow conduit, besides the valve plate, while also providing an air flow conduit with an essentially round cross section with a diameter which may be maintained throughout the length of the valve and while the valve plate is dimensioned as an oblique cross section of the conduit. The axis of rotation of the valve plate is offset from the center of the valve plate and further offset from the center of the conduit while rotation of the valve plate within the conduit to an open position where the valve plate is aligned with a plane parallel with the axis of rotation of the valve plate and the center of the conduit is accomplished by providing two opposing indentations on the interior surface of the conduit which accommodate the maximum diameter of the valve plate when rotated to an open position.

GENERAL SUMMARY DISCUSSION OF INVENTION

It is thus an object of the invention to provide an offset butterfly valve with improved air flow efficiency with no interruptions extending into the valve air flow conduit while a cross section of the conduit is essentially round and a consistent diameter for the length of the valve and the valve plate rotatably positioned and offset therein is an oblique cross section of the conduit.

It is a further object of the invention to provide an offset butterfly valve with an offset valve plate with a rotation axis offset from the center of the valve plate and offset from the center of the air flow conduit which is dimensioned as an oblique cross section of the air flow conduit and includes a sealing periphery which mates with a sealing surface in the interior of the air flow conduit wherein the sealing surface on the interior of the conduit includes no interruptions or disruptions of air flow there through.

Accordingly, an offset butterfly valve is provided that includes a valve body with an air flow conduit extending there through wherein any cross section of the conduit is about equal in diameter and essentially round with no interruptions to impede or disrupt air flow there through. A valve plate is dimensioned as an oblique cross section of the conduit at a location in the conduit where the valve plate will seal with an interior surface of the conduit. The valve plate is rotatable mounted within the conduit with an axis of rotation offset from the center of the valve plate and further offset from the center of the conduit while rotation of the valve plate within the conduit to an open position, where the valve plate is aligned with a plane parallel with the axis of rotation of the valve plate and the center of the conduit is accomplished by providing two opposing indentations on the interior surface of the conduit which accommodate the maximum diameter of the valve plate when rotated to an open position. The peripheral edge of the valve plate is easily machined to seal with an interior surface of the conduit which is continuous with the conduit interior surface providing a smooth unobstructed efficient air flow path. The valve plate shaft ends may be contained within the material forming the valve body or exit one or opposing sides on the valve body providing attachment locations for latching, biasing, tripping, closing or opening means. The valve may be adapted for numerous applications which will dictate inclusion of and a type of valve tripping or shaft rotation biasing means attached thereto. The shaft rotation may be allow to freely rotate when the valve is used as a check, while a spring biasing the shaft to rotate closed may be used for other applications such as a diesel exhaust brake, or air flow intake shut-off device. Tripping the shaft to rotate to a closed position may also be accomplished by any number of suitable means beyond the scope of this application.

BRIEF DESCRIPTION OF DRAWINGS

For a further understanding of the nature and objects of the present invention, reference should be had to the following detailed description, taken in conjunction with the accompanying drawings, in which like elements are given the same or analogous reference numbers and wherein.

EXEMPLARY MODE FOR CARRYING OUT THE INVENTION

Figure 1:
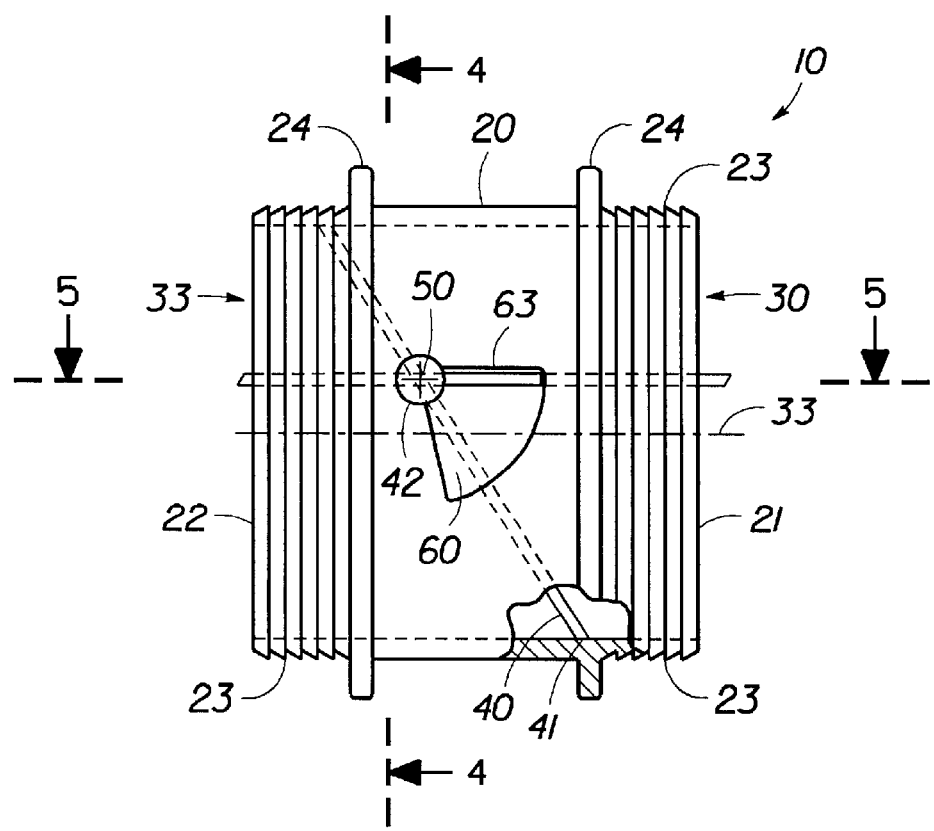
FIG. 1 is a side view elevation illustrating the butterfly valve body, air flow conduit extending there through, the valve plate and the arrangement of one indentation on the interior surface of the conduit and the valve plate shaft aperture, while the valve plate is illustrated in an open and closed position.

It can be seen from the following description that the present butterfly valve over comes problems associated with air flow disruption through a conduit of the valve providing an efficient easily manufactured and cost effective valve suitable for numerous applications. The butterfly valve 10 includes the main components; valve body 20, conduit 30, valve plate 40, valve plate shaft 50, two opposing indentations 60, and tripping means 70.

Figure 2:
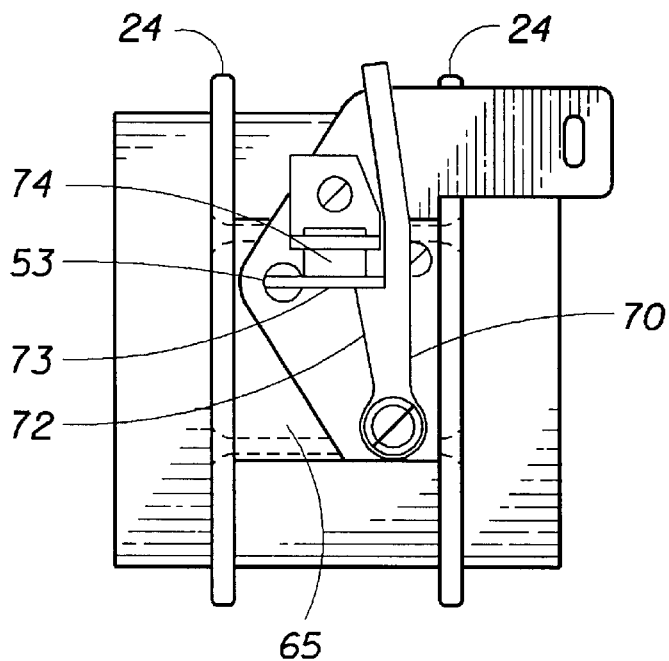
FIG. 2 is a side view elevation of a locking and tripping mechanism attached to an end of the valve plate shaft.
Figure 3:
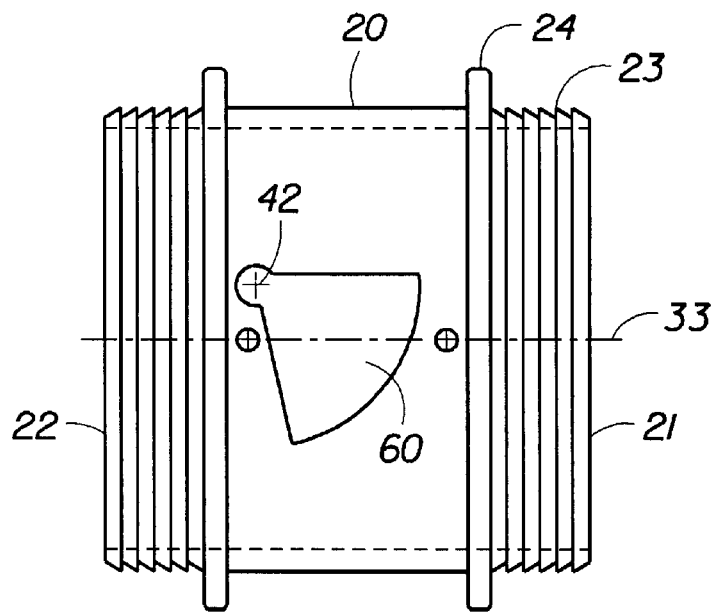
FIG. 3 is a side view of the valve body illustrating one indentation for accommodating the valve plate when rotated to an open position and the dimensions for such indentation.

The valve body 20 is basically cylindrical in shape with an upstream end 21, where air enters the valve through conduit 30, and a down stream end 22 where air exits the valve through conduit 30. Depending upon the application of the valve, the upstream and down stream ends may be reversed. The valve body 20 may be constructed by numerous methods including forging, molding, turning and the like. The valve body 20 may be constructed of various materials depending on the application for the valve including stainless steel, aluminum, and plastic. Either one or both ends of the valve body may include connecting sleeve portions 23 which assist with connecting the valve body to existing pipe so the valve is easily included within a pipe. FIGS. 1, 2 and 3 illustrate a valve body which has been turned from cylindrical stock of rod stock and where two support rings 24 are included for adding rigidity to the valve body and also to act as a stop for mounting the valve body to pipe so that connecting pipe is slid up to the ring 24 and clamped in place. The interior bore of the valve body forms the conduit 30 which is continuous from the upstream to down stream ends of the valve body. Any cross section of the conduit 30 is round and a diameter dimension of the conduit is consistent through the entire length.

Figure 6:
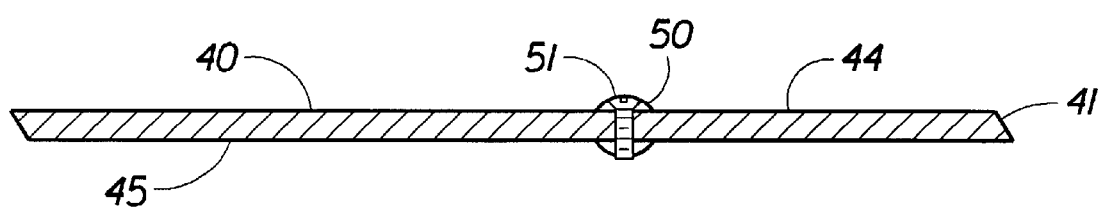
FIG. 6 is a cross section of the valve plate taken along line 6—6 of FIG. 5 illustrating the periphery edge sealing angle and the valve plate shaft offset from the center of the valve plate.

The valve plate 40 is illustrated as a cross section in FIG. 6 and is basically flat material with the shape of an oblique cross section taken from the conduit in a location in the conduit where the valve plate will seal in a closed position.

Figure 4:
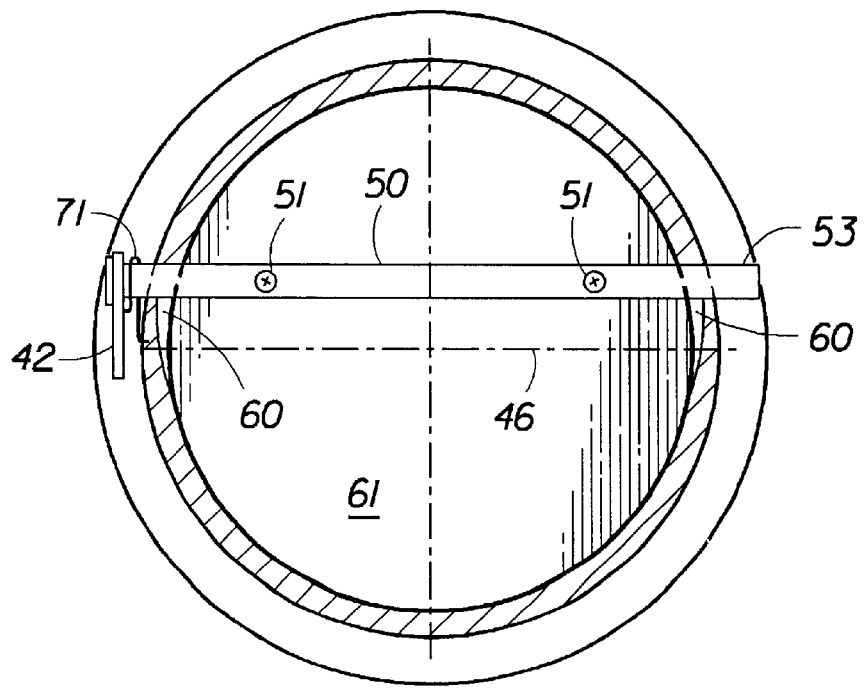
FIG. 4 is a cross section taken along line 4—4 of FIG. 1 which is an end view of the valve plate in a closed positioned illustrating the opposing indentations on the interior surface of the conduit.
Figure 5:
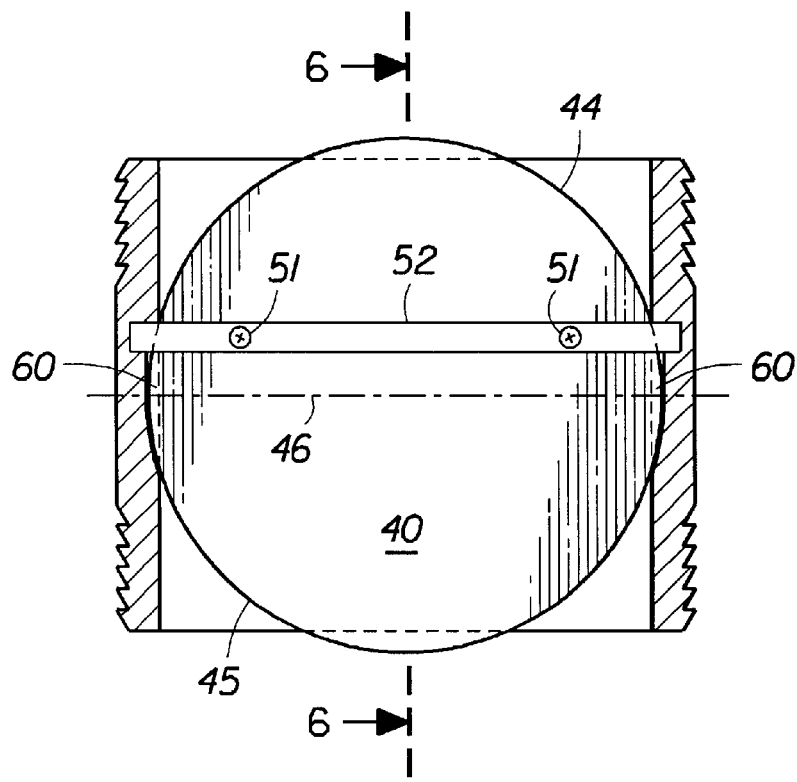
FIG. 5 is a cross section taken along line 5—5 of FIG. 1 which is a top view of the valve body and valve plate therein in a closed position with the maximum diameter of the valve plate projecting into the two opposing indentations on the interior surface of the conduit.

The valve plate 40 includes a peripheral edge 41 which is angled to correspond and be parallel to a sealing surface on the interior of the conduit 30. The valve plate 40 is rigidly constructed and rotatably mounted within the conduit 30 where the rotational axis 42 is offset from a center 43 of the valve body 40 as illustrated in FIG. 5. The offset mount of the valve plate 40 creates two coplanar sections of the valve plate, a smaller first section 44 and a larger second section 45, the larger second section 45 as with all offset butterfly valves creates a closing or opening rotational force when air flow pushes against it. The valve plate 40 is mounted to a valve plate shaft 50 which is a split shaft and retained in position with at least two screws 51. The shaft 50 is mounted on the valve body and extends through the conduit offset from the center line 33 of the conduit. The shaft ends 52 may be contained with the valve body as illustrated in FIG. 5 to assure no leakage occurs at the shaft and when control of rotation of the shaft is not a concern. The shaft may also be extended 53 so that one or both ends exits the valve body as illustrated in FIGS. 1, 2 and 4 so that control or biasing means may be attached to the either one or both of the shaft ends. The obliquely shaped valve plate 40 includes a minimum diameter 46 which is about equal to a diameter of the conduit so that inserting the valve plate 40 in the conduit is accomplished by aligning the minimum diameter of the valve plate with the diameter of the conduit.

The valve plate 40 will only be accommodated within the conduit if two opposing indentations 60 are provided. The indentations 60 allow the valve plate 40 to rotated to an open position, about axis 42 so that the valve plate 40 is aligned with a plane parallel with the axis of rotation 42 and parallel with conduit center 33, as illustrated in FIG. 1. In order for this rotational motion to occur, the opposing indentations 60 must be aligned and positioned within the conduit so that a minimum diameter 46 of the valve plate is accommodated by the indentations 60 when the plate is rotated. FIG. 5 illustrates a view of the valve plate rotated to the open position with the valve plate minimum diameter 46 accommodated by the indentations. The indentations 60 are an arc originating at the rotational axis 42 with a depth that is maximum at end 63 where the valve plate will be in full open position and shallowest at end 64 near the center of the conduit, as illustrated in FIGS. 1 and 3. The indentations 60 may extend through the valve body as illustrated in FIG. 3 and covered by shaft mounting plate 65 positioned between the rings 24. The indentations 60 do not interfere with the air flow through the valve conduit and the only interference with air flow will be the leading edge of the valve plate and the split shaft.

Tripping means 70 may be attached to either end of the extended shaft 53 to activate rotation or resist rotation of the shaft. FIG. 4 includes a spring 71 attached to an end of the shaft to urge the shaft to remain rotated in a closed position while FIG. 2 illustrates a more elaborate tripping means which includes a release arm 72 biased and shouldered to lock the rotation of the shaft 53 by catching arm 73 which rotates with the shaft to a rubber stopper 74 while a mount is included for attaching various activation means to the release arm.

It is noted that the embodiment of the offset butterfly valve described herein in detail for exemplary purposes is of course subject to many different variations in structure, design, application and methodology. Because many varying and different embodiments may be made within the scope of the inventive concept(s) herein taught, and because many modifications may be made in the embodiment herein detailed in accordance with the descriptive requirements of the law, it is to be understood that the details herein are to be interpreted as illustrative and not in a limiting sense.

I claim:

1. An offset butterfly valve comprising:
   (a) a valve body with an air flow conduit extending there through wherein a cross section of the conduit is round,
   (b) a flat valve plate dimensioned as an oblique cross section of the conduit and rotationally mounted within the conduit about a rotational axis of a valve plate shaft which is offset from a center of the valve plate and offset from a center axis of the conduit,
   (c) two opposing indentations on an interior surface of the conduit positioned and dimensioned to accommodate a minimum diameter of the valve plate when the valve plate is rotated to an open position which is in alignment with a plane parallel to the axis of rotation of the valve plate and parallel to a center of the conduit, and wherein the indentations extend through the valve body and are shaped as an arc originating at the axis of rotation of the valve plate with an indentation cover removably attached to an outside surface of the valve body.

2. The offset butterfly valve of claim 1 wherein the indentations are shaped as an arc originating at the axis of rotation of the valve plate with a deep end of the arc indentations accommodating the minimum diameter of the valve plate when the plate is in an open position wherein the deep end slopes up to be even with an interior surface of the conduit.

3. The offset butterfly valve of claim 1 wherein the valve body further comprises support rings circumferentially attached to a valve body exterior surface and which provide structural integrity to the valve body.

4. The offset butterfly valve of claim 1 wherein the valve body further comprises connecting surfaces on each end for attaching the valve in line to pipe.

5. The offset butterfly valve of claim 1 wherein the valve plate shaft further comprises a split shaft with at least one end that extends through the valve body.

6. The offset butterfly valve of claim 5 wherein at least one end of the shaft extending from the valve body further comprises a biasing mean for urging the shaft rotation to either open or close the valve plate.

7. The offset butterfly valve of claim 5 wherein at least one end of the shaft extending from the valve body further comprises a tripping means for either opening or closing the valve.

* * * * *